(12) United States Patent
Fainberg et al.

(10) Patent No.: US 12,063,234 B2
(45) Date of Patent: Aug. 13, 2024

(54) ANOMALY DETECTION INCLUDING PROPERTY CHANGES

(71) Applicant: FORESCOUT TECHNOLOGIES, INC., San Jose, CA (US)

(72) Inventors: Ilya Fainberg, Tel Aviv (IL); Tomer Iyar, Petach Tikva (IL); Abdelhamid Masarwa, Arara (IL)

(73) Assignee: Forescout Technologies, Inc., San Jose, CA (US)

( * ) Notice: Subject to any disclaimer, the term of this patent is extended or adjusted under 35 U.S.C. 154(b) by 249 days.

(21) Appl. No.: 16/584,001

(22) Filed: Sep. 26, 2019

(65) Prior Publication Data

US 2021/0099473 A1    Apr. 1, 2021

(51) Int. Cl.
*H04L 9/40* (2022.01)
(52) U.S. Cl.
CPC ...... *H04L 63/1425* (2013.01); *H04L 63/1416* (2013.01)
(58) Field of Classification Search
CPC ............. H04L 63/1425; H04L 63/1416; H04L 63/1466; H04W 12/12
See application file for complete search history.

(56) References Cited

U.S. PATENT DOCUMENTS

| 7,181,768 | B1 * | 2/2007 | Ghosh | ................ | H04L 63/1408 726/23 |
| 7,574,202 | B1 * | 8/2009 | Tsao | ..................... | H04W 12/64 455/435.2 |
| 2003/0185244 | A1 | 10/2003 | Wu et al. | | |

(Continued)

FOREIGN PATENT DOCUMENTS

| EP | 3223495 A1 | 9/2017 |
| WO | 2019025386 A1 | 2/2019 |
| WO | 2019134334 A1 | 7/2019 |

OTHER PUBLICATIONS

PCT International Search Report and Written Opinion from related PCT Application No. PCT/US2020/049747, mailed on Nov. 20, 2020 (11 pages).

(Continued)

*Primary Examiner* — Farid Homayounmehr
*Assistant Examiner* — Mudasiru K Olaegbe
(74) *Attorney, Agent, or Firm* — Womble Bond Dickinson (US) LLP (57) ABSTRACT

Systems, methods, and related technologies for determining an anomaly based on properties associated with an entity are described. The determination of an anomaly associated with an entity may include accessing network traffic from a network and storing a first value of a property associated with an entity communicatively coupled to the network. The first value of the property is based on the network traffic. Additional network traffic associated with the entity may be accessed and a second value of the property determined based on the additional network traffic. Whether the first value of the property does not match the second value of the property may be determined and in response to the first value of the property not matching the second value of the property, an indicator that an anomaly has detected may be stored. An action may be performed based on determination of an anomaly.

20 Claims, 5 Drawing Sheets

(56) References Cited

U.S. PATENT DOCUMENTS

| | | | |
|---|---|---|---|
| 2004/0250124 A1* | 12/2004 | Chesla | G06F 21/552 709/224 |
| 2007/0113281 A1* | 5/2007 | Leach | G06Q 40/08 726/22 |
| 2013/0046464 A1* | 2/2013 | Vis | G01C 21/3407 701/527 |
| 2013/0275567 A1* | 10/2013 | Karthikeyan | H04L 43/16 709/221 |
| 2014/0357273 A1* | 12/2014 | Teng | H04W 8/02 455/436 |
| 2016/0173511 A1* | 6/2016 | Bratspiess | H04L 63/1425 726/23 |
| 2016/0344601 A1* | 11/2016 | Kaku | H04L 12/413 |
| 2018/0241654 A1* | 8/2018 | Danichev | H04L 63/1416 |
| 2018/0357415 A1* | 12/2018 | Dhondse | B25J 9/163 |
| 2019/0182278 A1* | 6/2019 | Das | H04L 63/1425 |
| 2020/0304535 A1* | 9/2020 | Sant-Miller | H04L 63/1441 |
| 2020/0364128 A1* | 11/2020 | Vittal | G06F 9/45558 |
| 2021/0067533 A1 | 3/2021 | Zhou | |

OTHER PUBLICATIONS

PCT International Preliminary Report on Patentability from related PCT Application No. PCT/US2020/049747, mailed on Apr. 7, 2022 (8 pages).

* cited by examiner

ANOMALY DETECTION INCLUDING PROPERTY CHANGES

TECHNICAL FIELD

Aspects and implementations of the present disclosure relate to network monitoring, and more specifically, detecting one or more anomalies associated with entities on a network.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to anomaly detection based on one or more variations or changes of properties associated with an entity and optionally performing one or more actions based on the detection of an anomaly. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras (internet protocol (IP) cameras), wearable devices, medical devices, etc.) in both information technology (IT) and operational technology (OT) environments can make it difficult to effectively ensure that network security is maintained. Accordingly, described herein in various implementations are systems, methods, techniques, and related technologies, which allow for determining if a spoofing or other type of attack is occurring based on changes in properties associated with an entity and optionally taking one or more actions in response.

In the last few years the number of connected devices has grown exponentially while prices are drastically dropping. This trend introduces an extensive risk to the organization, it is now easier than ever to build a malicious rogue traditional device (e.g., laptop or printer), bring it to a corporate location, and seamlessly introduce it into the organizational network to cause damage to critical services or exfiltrate data.

Current products anomaly capabilities are based on dynamic traffic analysis including learning behavior over time and matching pre-defined signatures for different types of devices such as an intrusion prevention system (IPS). These products do not have the ability or context to analyze and detect anomalies based on the profile and characteristics of a device over time.

Further, as the number of devices on networks grows, it becomes unrealistic to monitor on a centralized basis the traffic, or scale to the amount of, traffic coming from each device on one or more large networks. Thus, there is a need for complementary anomaly detection solution that can fill the gap.

An entity or entities, as discussed herein, include devices (e.g., computer systems, for instance laptops, desktops, servers, mobile devices, IoT devices, OT devices, healthcare devices, financial devices, etc.), network devices or infrastructure (e.g., firewall, switch, access point, router, enforcement point, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service).

Enforcement points including firewalls, routers, switches, cloud infrastructure, other network devices, etc., may be used to enforce segmentation on a network (and different address subnets may be used for each segment) and restriction communications between one or more network portions. Enforcement points may enforce segmentation by filtering or dropping packets according to the network segmentation policies/rules.

The enforcement points may be one or more network devices (e.g., firewalls, routers, switches, virtual switch, hypervisor, SDN controller, virtual firewall, etc.) that are able to enforce access or other rules, access control lists (ACLS), or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. it is appreciated that an enforcement point may be any device that is capable of filtering, controlling, restricting, or the like communication or access on a network.

Operational Technology (OT) can include devices from a wide variety of industries, including, but not limited to, medical systems, electrical systems (e.g., power generation, power distribution, and other power utility devices and infrastructure), oil and gas plants, mining facilities, manufacturing systems, water distribution systems, chemical industry systems, pharmaceutical systems, infrastructure systems (e.g., used with roads, railways, tunnels, bridges, dams and buildings), and other industrial control systems.

Embodiments supports any characteristics or properties of an entity being used for anomaly detection. The properties monitored may be user selected or preconfigured (e.g., default properties or configured via a policy). This can include things such as device type, hostname, connection type, user name, IP address, etc., and any properties that deviate or change from normal or previous property values can be treated as an indication the something is wrong. The property values can be determined based on network traffic (e.g., passive monitoring), properties from entities (e.g., requested as part of active monitoring), accessing network properties (e.g., from network infrastructure), and any other data available via a network.

Embodiments support property monitoring via distributed modules thereby enabling a decentralized way to detect anomalies. For example, embodiments may be configured as individual modules that monitor for anomalies on associated portions of a network. This allows embodiments to scale in situations where a centralized analysis of traffic from multiple networks would not be practical. In some embodiments, centralized monitoring of multiple modules performing anomaly detection is supported thereby providing reporting on locations of anomalies across one or more networks.

Embodiments are able to monitor the properties of each entity on a network over time, starting from the initial communicative coupling to the network. The ability to monitor for anomalies can be based on listening to network admission events of each entity on one or more networks and monitors for property changes over time (e.g., a profile for an entity may be stored and include a set of hundreds of properties based on the context collected from the relevant entity and the network). Embodiments support monitoring for when a threshold of property changes is exceeded and embodiments may take one or more actions in response. For example, the actions may include notifying an operator (e.g., in real time or near real time) and providing options to respond (e.g., limiting device access, etc., as described herein).

Embodiments are able to monitor a variety of properties including, but not limited to, network interface card (NIC) vendor (e.g., organizationally unique identifier (OUI) portion of a media access control (MAC) address, dynamic host control protocol (DHCP) vendor class, hypertext transfer protocol (HTTP) user agent string, operating system (OS) data, network function, connection type (e.g., wired or wireless), transmission control protocol/internet protocol (TCP/IP) Syn Ack fingerprint, virtual machine guest OS, Nmap-Banner, Windows™ version, DHCP hostname, Macintosh Manageable, DHCP device class, Linux Manageable, open ports, DHCP options list, DHCP request list, DHCP device OS, MAC Address, Macintosh OS Version, domain name system (DNS) Name, Linux™ OS version, Switch Port power over Ethernet (PoE) connected device, system description, Classified by Action or operator classified, device is a network address translation (NAT) device, Windows™ Services Installed, and Switch Port Name.

For example, the properties of a printer may be accessed from network traffic (e.g., passively by monitoring communications sent by the printer or actively, for instance in response to communications sent by embodiments), properties determined from the network traffic, and the properties stored over time. An attacker may then try to spoof the MAC address of the printer by configuring a Windows™ laptop to have the same MAC address as the printer in order to get unfettered access to the network. This can be particularly problematic in the case of a MAC address bypass list in an 802.1X environment, where devices on the MAC address bypass list are not authenticated using 802.1X. Embodiments are able to determine the properties of the Windows™ laptop (e.g., operating system, DHCP device class, network function, etc.) and compare them to the previously stored properties of the printer. Depending on the configuration or threshold used and the variance in properties, embodiments may then take actions including sending a notification, limitation network access of the laptop, quarantining the Windows™ laptop, etc., or a combination thereof.

Embodiments support the using of changes in multiple properties through use of a threshold to detect an anomaly. In some embodiments, a threshold is used to determine whether an anomaly has been detected based on one or more changes in one or more properties. The threshold can be a number of changes (e.g., in multiple separate properties) that signify or represent an anomaly. That is, the threshold can be the number of changed properties that can occur in order to count or qualify as an anomaly and in response, one or more actions can be taken. For example, a threshold may be three meaning that changes in three properties represent an anomaly. In some embodiments, there is a default threshold that may apply to any properties being monitored. For example, a default threshold of four will detect an anomaly based on four different properties of an entity changing (e.g., within a particular time period). A threshold may be configured to avoid a false positive based on changes in one or more properties.

A threshold may further be associated with a particular or specific type of anomaly. For example, a threshold of two specific properties changes may be associated with MAC address spoofing. The two specific properties may be a MAC vendor (OUI) property and operating system property (e.g., DHCP device OS).

The thresholds may be configurable both on a quantity basis (e.g., a number of changes to qualify as an anomaly) and the properties that are monitored for changes (e.g., particular properties that are associated with a threshold). Properties for which changes may be selected to count towards a threshold can be configured by a user or configured via a policy.

In some embodiments, the threshold may be applied on a device type basis. The threshold may be configured as a number of properties changes for a particular device type. For example, a threshold may be set for three property changes (e.g., of three separate properties) for IP cameras or IP cameras by a particular manufacturer.

A threshold may be configured on a per monitoring entity (e.g., network monitor device 102, 280, or 282) basis meaning that different thresholds may be applied in different parts of a network or one or more networks. For example, in an OT environment, for instance a manufacturing facility, a threshold may be set to two changes of any two properties. A threshold may further be applied to a portion of a network, for instance, a segment, a subnet, a virtual local area network (VLAN), a service set identification (SSID), etc.

Embodiments support a weight (e.g., a positive integer) being applied to a property thereby prioritizing a property over other properties. For example, a change in an operating system property may be weighted more and may trigger an action while a change in a power over Ethernet (POE) status property may not. The weight may be a multiplier applied to a number (e.g., one) representing a single change of a property. In effect, the weight will make a change in a property count for changes in multiple properties. For example, a weight may be two for a particular property meaning that a change in that property will count as two (changes) towards a threshold (e.g., a threshold of three). Weights can be user configurable on a per property basis and there may be default weight values for one or more properties (e.g., based on a policy).

In some embodiments, a counter is incremented (e.g., by one) upon each property change and a weight causes incrementing the counter by the weight amount. The weight of a property may thus allow a change in that property to count or have the effect of multiple properties changing (e.g., with respect to threshold). For example, if a counter is configured to increment by a value of one for each changed property, the counter may be incremented by a value of two based on a weight associated with a property being two. Thus, if the threshold is three and one property has changed with a weight of two, then a single property change will meet the threshold. As another example, if a threshold is five and a property with a weight of three has changed, then a property with weight of two changing or two properties (e.g., each with the weight of one or the default weight) changing will meet the threshold.

As another example, a property associated with a protocol used by a healthcare device may be weighted more and may be considered very sensitive. The weight of this protocol property may be three meaning that if the threshold is three, a change in the protocol property (e.g., representing the protocol the healthcare device is using) will meet the threshold to identify an anomaly or attack.

Overlapping properties are properties that are associated with a particular aspect or detail of an entity and each of the overlapping properties change upon the particular aspect or detail of the entity changing. The overlapping properties thus often change at the same or nearly the same time for a single change with respect to an entity. For example, a DHCP device operating system (OS) property and an OS property (e.g., a Windows™ version property) are associated with the operating system of an entity and when the operating system of the entity changes (e.g., if the entity is able to boot different operating systems) the DHCP device operating system (OS) and OS properties change.

In some embodiments, overlapping properties may be grouped so that a change in multiple properties that overlap reflects or indicates one change with respect to an entity and are counted as a single change. The overlapping properties can be grouped as a logical property that represents a single change in a detail or aspect of an entity. This enables embodiments to more accurately report anomalies as changes in multiple overlapping properties associated with the same detail of an entity are treated as a change in a single property. This allows embodiments to avoid false positives where multiple overlapping properties change based on a single detail associated with an entity but the number of changed properties meets or exceeds a threshold. In some embodiments, the overlapping properties may be defined by default or defined by a user.

Advantageously, embodiments are able to complement traffic based anomaly detection in order to extend the reachability of the anomaly detection capabilities to each device on any network and across networks. By monitoring property changes, embodiments do not have a requirement to monitor the behavior of an entity over a period of time to learn a baseline behavior of the entity. Such behavioral monitoring can be substantial in time and in computational resources due to analyzing substantial amounts of traffic. Embodiments are able to identify anomalies in close to real time or real time as properties are reported continuously (e.g., using characteristic collection engines). Prioritizing or automating one or more actions can then be performed, including notifying an administrator or automatically changing a VLAN assignment of a vulnerable device.

Embodiments are able to monitor context collected from both the network and an entity without an agent, in near real time or real time, and compare it to the previous context (of properties) over time, continuously. In some embodiments, the properties may be determined upon an entity communicatively coupling to the network. Embodiments are further able to detect attacks, e.g., spoofing, based on differences in the properties of the victim device and the attack or spoofing device. Embodiments further allow customization of the anomaly detection based on selected property monitoring, configurable weighting of one or more properties, configuring thresholds, configurable selection of properties associated with a threshold, configurable overlapping properties, etc., as described herein.

Embodiments can further take one or more actions based on detecting an anomaly. The actions can include changing the network portion (e.g., VLAN, SSID, segment, subnet, etc.) that a device is assigned to and thereby changing risk associated with a network portion. Actions can further include changing the communications configuration of a network portion (e.g., which network portion(s) a network portion is able or allowed to communicative with). For example, one action can include preventing Internet access from a network portion or entity where an anomaly has been detected.

The actions can include changing the network portion configuration with respect to one or more devices (e.g., assigning the one or more devices to a different VLAN), blocking the one or more devices from communicating with other devices (e.g., assigning them to a quarantine VLAN). The actions may further include monitoring, logging, or a combination thereof to track communications of one or more entities, sending traffic to an intrusion detection system or other communication analysis system (e.g., system 150 or another system as described with respect to FIG. 1). In some embodiments, the passive actions may be performed along with sending a notification to indicate that the traffic of one or more devices is being monitored. The actions may further include moving an entity to a quarantine network portion, blocking the entity from communicating with other entities on a network, rerouting device traffic to an intrusion detection system, triggering an update or patch, etc.

Embodiments can be used in a variety of environments including, but not limited to, campus, data center, cloud, medical, and operational technology or industrial environments.

Accordingly, described herein in various implementations are systems, methods, techniques, and related technologies, which may perform anomaly analysis of each entity. As described herein, the anomaly detection based on changes in one or more properties can be used to optimize the network security.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Figure 1:
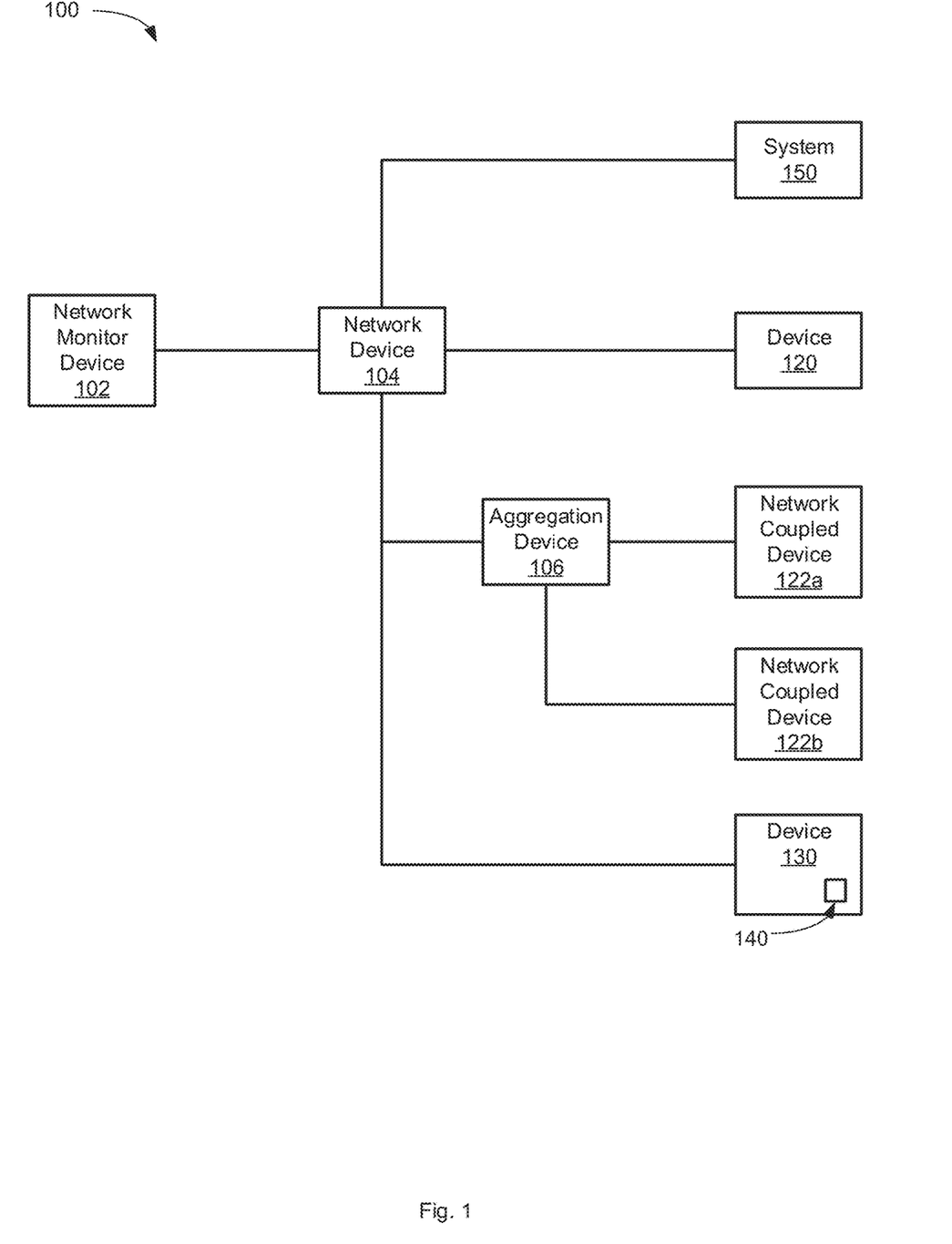
FIG. 1 depicts an illustrative communication network in accordance with one implementation of the present disclosure.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices or entities including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including determining an anomaly based on one or more changes in one or more properties associated with one or more entities, as described herein. The one or more properties may be based on a policy (e.g., one or more user selected properties, one or more default properties, a combination thereof, etc.). The policy may include a threshold for the number of changes of one or more properties that constitute an anomaly, as described herein. A counter ay be used with respect to one or more properties and used to determine if the number of changes of one or properties meets or exceeds the threshold thereby constituting an anomaly (e.g., MAC address spoofing), as described herein. In some embodiments, a weight may be applied to one or more properties to reflect the importance or significance of a change in that property relative to other properties, as described herein. In various embodiments, the policy may further include a configurable time period for which a timer may be used to determine whether the changes in one or more properties that constitute an anomaly occur within the time period. The policy may further define properties that are considered to overlap or change based on the same detail or aspect associated with an entity and a change in the overlapping properties is treated as a single property change, as described herein.

Network monitor device 102 may provide an interface (e.g., a graphical user interface (GUI)) for viewing and monitoring one or more anomalies (e.g., of one or more entities), modifying and configuring one or more selected properties to be monitored for changes, a threshold of changes to be met or exceeded to constitute an anomaly, weights to be applied to changes in one or more properties, a time period (e.g., one minute) to be associated with a threshold, properties that will be treated as overlapping properties, or a combination thereof. In some embodiments, network monitor device 102 is operable to perform visualization or display of property changes associated with an entity, the number of changes in relation to a threshold, the time remaining on a timer, a current value of a counter associated with one or more properties, one or more weights associated with one or more properties, or a combination thereof. This can allow a user to watch as property changes occur and a threshold is approached prior to an anomaly being detected.

Network monitor device 102 may further perform a variety of operations including identification, classification, and taking one or more remediation actions (e.g., changing network access of an entity, changing the virtual local area network (VLAN), sending an email, sending a short message service (SMS) message, active actions, passive actions, etc.), as described herein.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be an enforcement point including, but not limited to, a router, firewall, switch, hypervisor, software-defined networking (SDN) controller, virtual firewall, a next generation firewall (NGFW), cloud infrastructure, or other network device or infrastructure device.

Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In sonic embodiments, network monitor device 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), proprietary protocols, etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an application programming interface (API), command line interface (CLI), web interface, simple network management protocol (SNMP), etc.), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or $3^{rd}$ party systems (e.g., system 150) may further be used for determining one or more tags or characteristics for an entity. For example, a vulnerability assessment (VA) system may be queried to verify or check if an entity is in compliance and provide that information to network monitor device 102. External or $3^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different, levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured. to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in real-time which can then be used to determine a risk level of the entity.

Aggregation device 106 may be configured to communicate with network coupled devices 122a-b and provide network access to network coupled devices 122a-b. Aggregation device 106 may further be configured to provide information (e.g., operating system, entity software information, entity software versions, entity names, application present, running, or both, vulnerabilities, patch level, etc.) to network monitor device 102 about the network coupled devices 122a-b. Aggregation device 106 may be a wireless access point that is configured to communicate with a ide variety of devices through multiple technology standards or protocols including, but not limited to, Bluetooth™, Wi-Fi™, ZigBee™, Radio-frequency identification (RFD), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the types of devices on the network do not change often). The log information may include information of updates of software of network coupled devices 122a-b.

Figure 2:
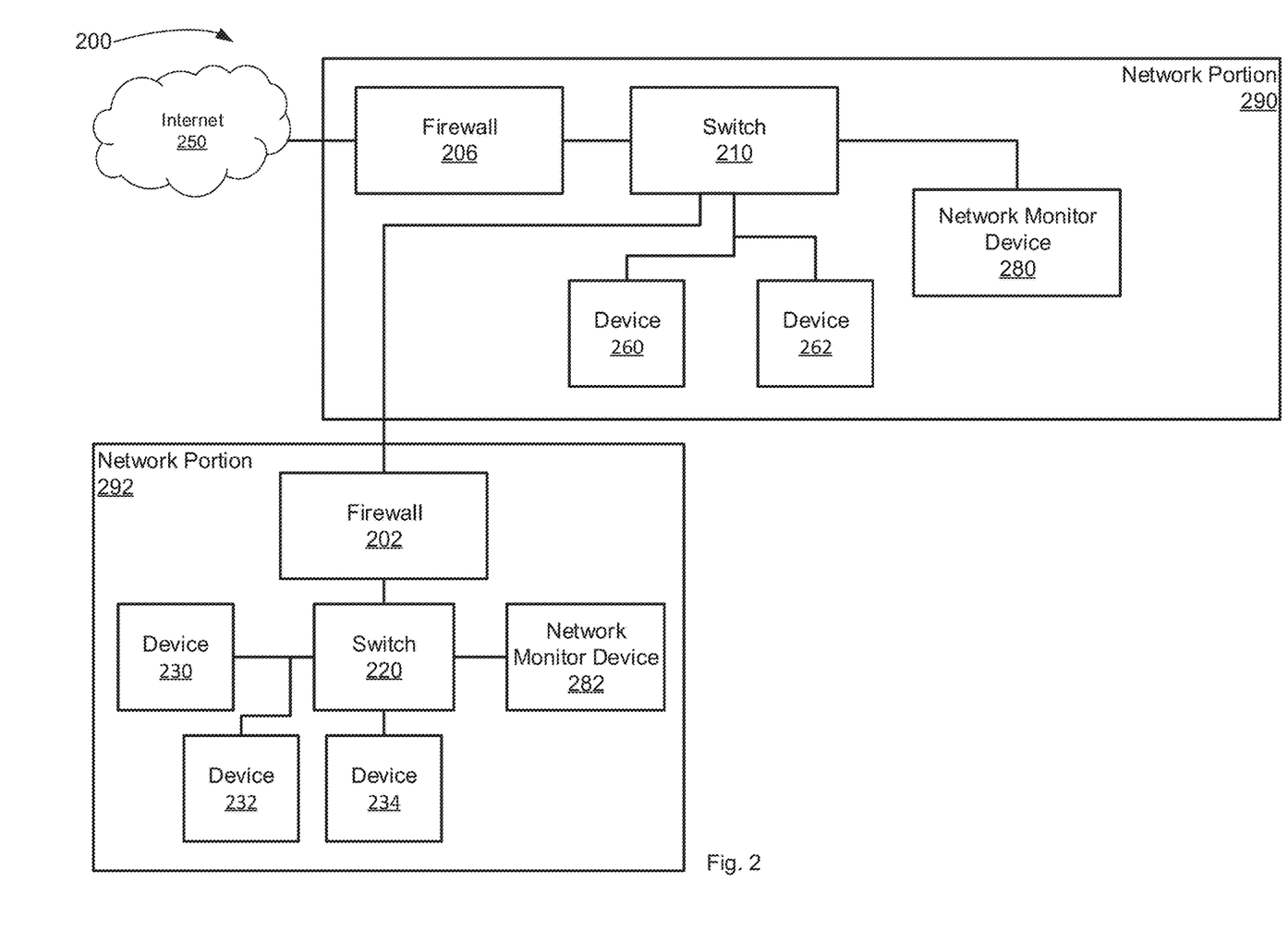
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewalls 202-206 and switches 210-220) and a network monitor devices 280-282 (e.g., network monitor device 102) which may perform anomaly detection, as described herein, associated with the various entities communicatively coupled to example network 200. Network monitor devices 280-282 can perform anomaly analysis of entities (e.g., devices 230-234 and 260-262) and use changes in properties associated with the entities to determine anomalies with respect to the entities (e.g., MAC address spoofing), as described herein. The information gathered by network monitor devices 280-282 can be used for prioritizing actions and security personnel responses, etc., as described herein.

FIG. 2 shows example devices 230-262 (e.g., devices 106, 122*a*-*b*, 120, and 130, other physical or virtual devices, other entities, etc.) and it is appreciated that more or fewer network devices or other entities may be used in place of the devices of FIG. 2. Example devices 230-262 may be any of a variety of devices or entities (e.g., OT devices, IoT devices, IT devices, etc.), as described herein, Enforcement points of example network 200 including firewalls 202-206 and switches 210-220 may be any entity (e.g., network device 104, cloud infrastructure, etc.) that is operable to allow traffic to pass, drop packets, restrict traffic, etc. Network monitor devices 280-282 may be any of a variety of network devices, router, firewall, an access point, network access control (NAC) device, intrusion prevention system (IPS), intrusion detection system (IDS), deception device, cloud-based device, virtual machine based system, etc. Network monitor devices 280-282 may be substantially similar to network monitor device 102. Network monitor devices 280-282 may be configured to share information including anomaly detection information and thereby provide information (e.g., dashboard, visualization, etc.) on anomalies detected throughout example network 200. Embodiments support IPv4, IPv6, and other addressing schemes. In some embodiments, network monitor devices 280-282 may be communicatively coupled with firewalls 202-206 and switches 210-220 through additional individual connections (e.g., to receive or monitor network traffic through firewalls 202-206 and switches 210-220).

Switches 210-220 communicatively couple the various devices of network 200 including firewalls 202-206, network monitor device 280, and devices 230-262. Firewalls 202-206 may perform network address translation (NAT) and firewall 202 may communicatively couple the devices 230-234, which are behind the firewall 202, with network monitor device 280, switch 210, and firewall 206. Firewall 206 communicatively couples network 200 to Internet 250 and firewall 206 may restrict or allow access to Internet 250 based on particular rules or ACLS configured on firewall 206. Firewalls 202-206 and switches 210-220 are enforcement points, as described herein.

Network monitor devices 280-282 are configured to identify, classify, determine one or more characteristics of entities (e.g., devices 230-262), monitor properties of each entity (e.g., devices 230-262), determine changes in properties associated with entities devices 230-262), and determine anomalies based on the changes in properties, and determine if the changes in properties are an anomaly (e.g., using a threshold), perform one or more actions based on an anomaly, or a combination thereof on network 200, as described herein. Network monitor devices 280-282 can access network traffic from network 200 (e.g., via port mirroring or switched port analyzer (SPAN) ports of firewalls 202-206 and switches 210-220). Network monitor devices 280-282 can perform passive scanning of network traffic by observing and accessing portions of packets from the network traffic of network 200. Network monitor devices 280-282 may perform active scanning of an entity of network 200 by sending one or more requests to any entity of network 200. The information from passive and active scans of entities of network 200 can be used to classify, identify, determine properties, and determine changes in properties for each entity of network 200, as described herein. The changes in properties can be used to determine (e.g., based on weight, threshold, time period, etc.,) if there is an anomaly associated with an entity (e.g., MAC address spoofing), as described herein.

As shown, network 200 includes network portions 290-292. Network portions 290-292 may be VLANs, SSIDs, segments, subnetworks, locations (e.g., campuses, buildings, data centers, floors, etc.), etc. Network monitor device 280 may determine one or more anomalies associated with one or more entities of network portion 290 (e.g., based on changes in properties associated with devices 260-262), as described herein. Network monitor device 282 may determine one or more anomalies associated with the one or more entities of network portion 292 (e.g., based on changes in properties associated with devices 230-234), as described herein. In some embodiments, network monitor device 280 may further be communicatively coupled to switch 220 to provide redundant anomaly detection to network monitor device (e.g., if network monitor device 282 were to become operational) or vice versa.

For example, network 200 may be a network of manufacturing plant, with devices 260-262 being IT devices (e.g., desktop computers) and devices 230-234 being OT devices (e.g., manufacturing control equipment). Network monitor device 280 may have a policy configured for monitoring for changes in three particular properties of operating system, DHCP device class, network function. The threshold may be three changes among the properties and the weight associated with the operating system property may be two. The policy may further include a time period of five minutes.

Upon detecting a first change in an operating system property associated with device 262, network monitor device 280 may initialize a counter associated with device 262 to zero and increment the counter associated with device 262 by the weight of two thereby setting the counter to a value of two. Network monitor device 280 may start a tuner associated with device 262 at zero. Upon network monitor device 280 determining a change in the network function property of device 262, network monitor device 280 will increment the counter by one to a value of three. Network monitor device 280 will check if the timer is less than the time period specified in the policy, e.g., five minutes. If the timer is less than five minutes, network monitor device 280 will check if the counter value is equal to or greater than the threshold, e.g., three. Since the counter value of three is equal to or greater than the threshold of three, network monitor device 280 may perform one or more actions including sending a notification of a possible MAC spoofing event, changing the VLAN of device 262, change one or more rules on enforcement points, e.g., firewall 206 and switch 210, to restrict access of device 262 to the Internet 250 or other devices.

Network monitor device 282 may have a policy configured for monitoring for changes in one particular protocols property used by OT devices 230-234. The threshold specified by the policy may be two changes or the threshold has a value of two. The policy may further include a time period of two minutes. Device 230 may be a SCADA device and devices 232-234 may be programmable logic controllers (PLCs).

Upon detecting a first change in a protocols property associated with device 230, network monitor device 282 may initialize a counter associated with device 230 to zero and increment the counter associated with device 230 by one thereby setting the counter to a value of one. Network monitor device 282 may start a timer associated with device 230 at zero. Upon network monitor device 282 determining a second change in the protocols property, network monitor device 282 will increment the counter by one to a value of two. Network monitor device 282 will check if the timer is less than the time period specified in the policy, e.g., two minutes. If the timer is less than two minutes, network monitor device 282 will check if the counter value is equal to or greater than the threshold. Since the counter value of two is equal to or greater than the threshold of two, network monitor device 282 may perform one or more actions including sending a notification of a possible compromise event, changing the VLAN of device 230, change one or more rules on enforcement points, e.g., firewall 202 and switch 220, to restrict access of device 230 to the Internet 250 or other devices.

Figure 3:
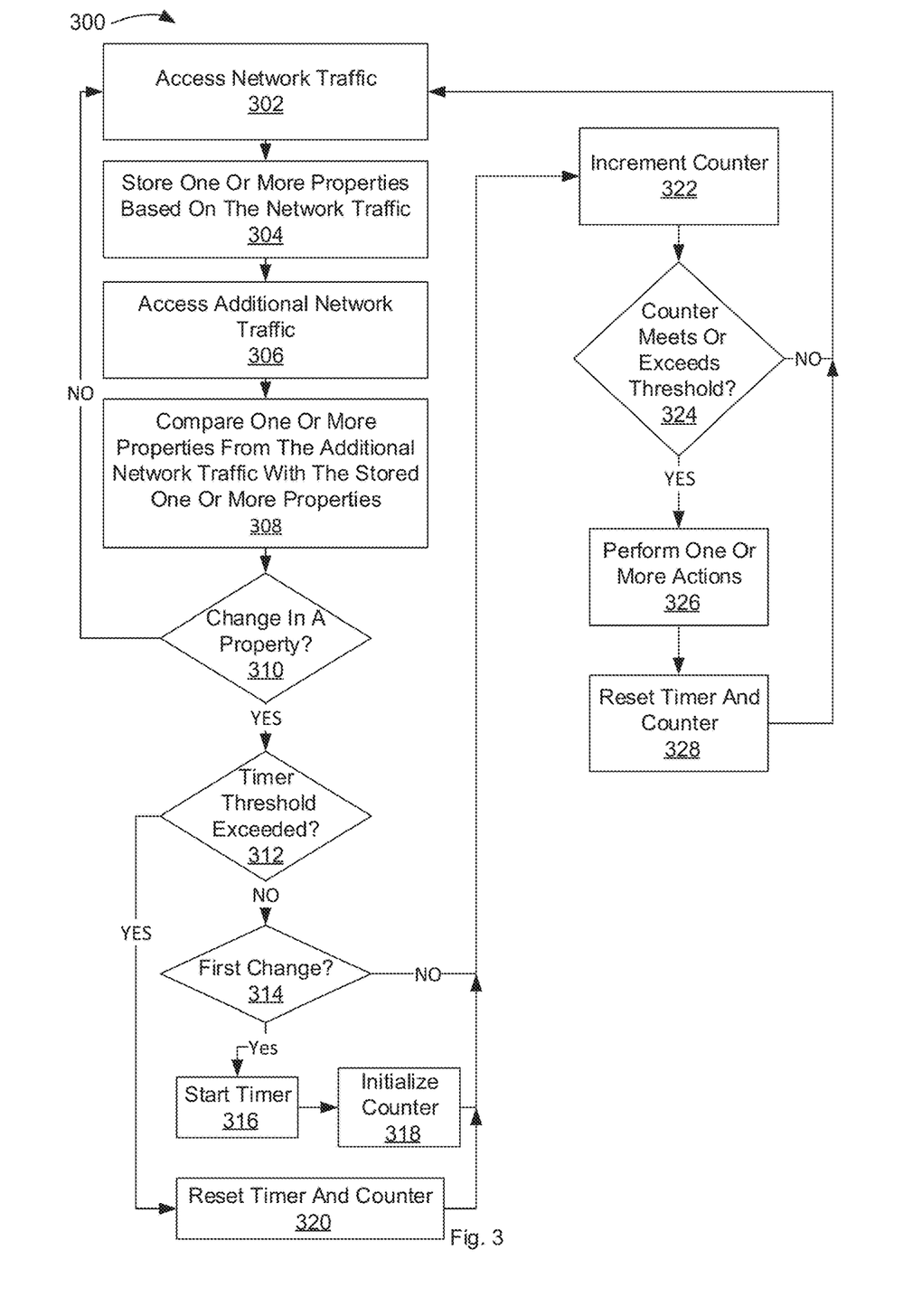
FIG. 3 depicts a flow diagram of aspects of a method for determining an anomaly based on one or more properties in accordance with one implementation of the present disclosure.

With reference to FIG. 3, flowchart 300 illustrates example operations used by various embodiments. Although specific operation blocks ("blocks") are disclosed in flowchart 300, such blocks are examples. That is, embodiments are well suited to performing various other blocks or variations of the blocks recited in flowchart 300. It is appreciated that the blocks in flowchart 300 may be performed in an order different than presented, and that not all of the blocks in flowchart 300 may be performed.

Figure 4:
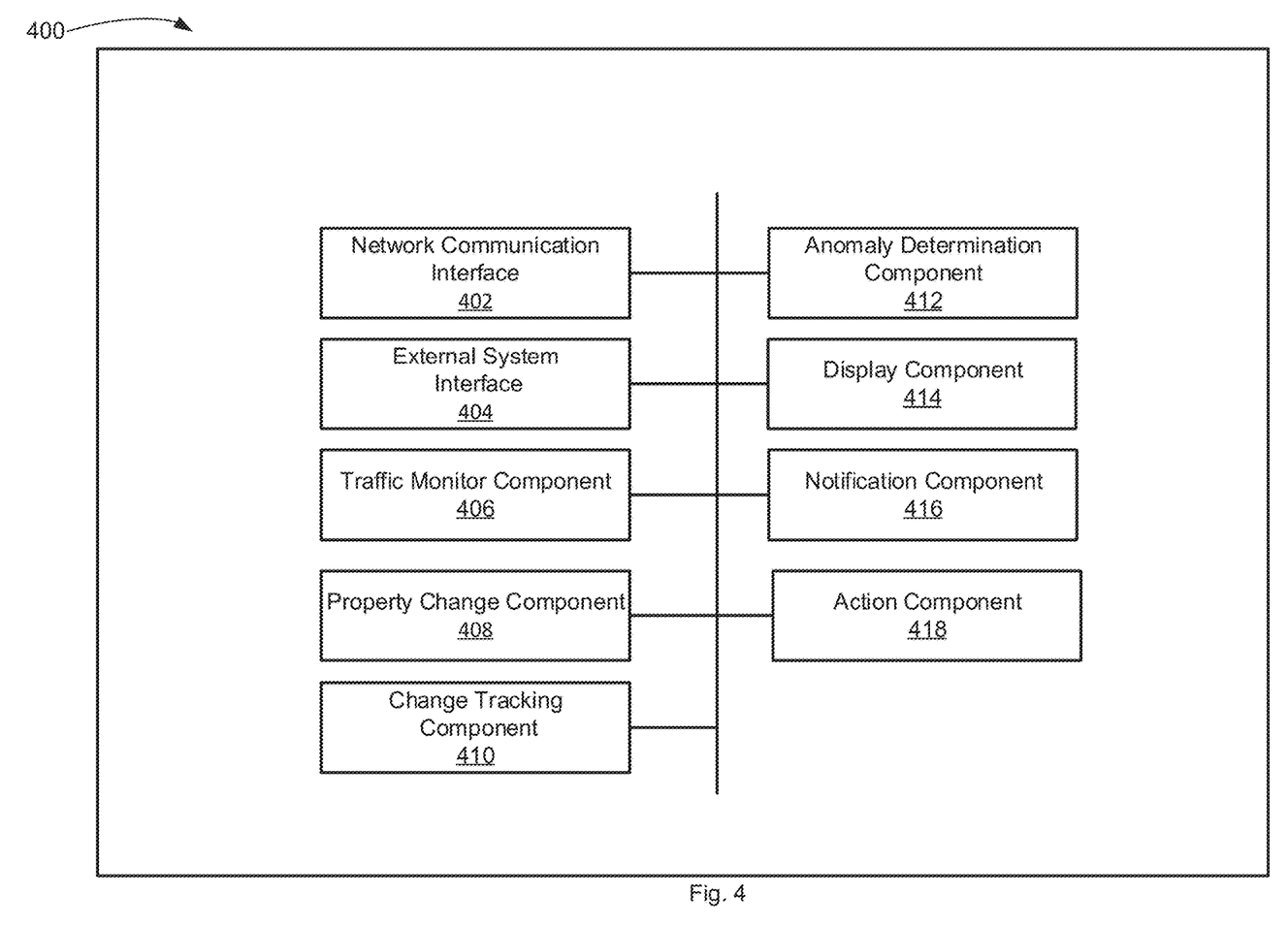
FIG. 4 depicts illustrative components of a system for determining an anomaly based on one or more properties in accordance with one implementation of the present disclosure.

FIG. 3 depicts a flow diagram of aspects of a method for determining an anomaly based on one or more properties in accordance with one implementation of the present disclosure. Various portions of flowchart 300 may be performed by different components (e.g., components of system 400) of an entity (e.g., network monitor device 102 or network monitor devices 280-282). Flowchart 300 depicts a process for determining an anomaly based on changes of one or more properties associated with an entity and (optionally) performing one or more actions (e.g., in response to determining one or more anomalies based on changes in an number of properties meeting or exceeding a threshold), as described herein.

At block 302, network traffic is accessed. The network traffic may be accessed via a SPAN port or other method, as described herein. One or more properties may be extracted, determined, selected, etc., from the network traffic for each entity, e.g., based on a policy or a configuration, as described herein. The properties may be determined based on active scanning (e.g., sending one or more requests to an entity) or passive scanning (e.g., determining properties from network traffic observed on the network). In some embodiments, one or more properties are accessed from network traffic upon communicative coupling of an entity to the network.

At block 304, one or more properties based on the network traffic are stored. The properties may be stored on a per entity basis thereby enabling tracking of property changes, as described herein.

At block 306, additional network traffic is accessed. The additional network traffic may be accessed over time to track changes in properties. Properties from the additional network traffic can be extracted as described with respect to block 302, as described herein. In some embodiments, each property is tracked so that multiple changes to a single property can be tracked over time.

At block 308, one or more properties from the additional network traffic are compared with the stored one or more properties. The comparison may be performed on an each property for each entity basis. In some embodiments, the properties compared are selected based on a policy thereby allowing checking on specifically selected properties for changes, as described herein.

At block 310, whether a property has changed is determined. The change of a property is based on the comparison of the stored property and the property accessed from the additional network traffic. If a property has changed, block 312 may be performed. If no property has changed, block 302 may be performed.

At block 312, whether a timer threshold, if any, has been exceeded is determined. The time threshold may be part of a policy or other configuration, as described herein. The timer threshold may be associated with a timer that is used to track one or more properties changes within a specific period of time for an entity. The timer may thus allow for tracking of changes within a particular time frame. If the timer threshold has been exceeded, block 320 may be performed. If the timer threshold has not been exceeded, block 314 may be performed.

At block 314, whether this is the first change to the property (associated with an entity) is determined. The determination may be with respect to the first change in any properties associated with an entity while the timer is less than the timer threshold. If the change is the first change to the property, block 316 may be performed. If the change is not the first change to the property, block 322 may be performed.

At block 316, a timer is started (e.g., initialized). In some embodiments, the timer is associated with an entity and the timer is used to track if a number of changes in properties is reached in a specified time period via the time threshold, as described herein. The timer is thus started upon a change in a property associated with an entity.

At block 318, a counter is initialized (e.g., to zero). The counter is used for tracking one or more property changes associated with an entity.

At block 320, the timer and counter are reset. For example, the timer associated with a specific entity may be restarted or initialized (e.g., starting count time from zero) to start tracking for a particular number of changes in one or more properties within a specific period of time (e.g., a time threshold). The counter associated with an entity may be reset (e.g., set to zero) when the time threshold has been met or exceeded by the timer.

At block 322, the counter is incremented. The counter is incremented to track the number a change in one or more properties (e.g., a single property or overlapping properties). In some embodiments, the counter is associated with multiple properties so that the counter tracks changes across multiple properties associated with an entity. In various embodiments, the counter is associated with an individual property. The default increment for the counter ay be one. Where a weight is associated with a property, as described herein, the counter may be incremented based on the weight associated with the property. For example, if the weight associated with a property is two, then the counter is incremented by two in response to a change in that property.

At block 324, whether the counter meets or exceeds a threshold is determined. This can be determined based on whether the counter value is greater than or equal to the threshold value (e.g., configurable threshold), as described herein. If the counter meets or exceeds the threshold, block 326 may be performed. If the counter does not meet or exceed the threshold, block 302 may be performed.

At block 326, one or more actions are (optionally) performed. The actions may include creating a record, notification, etc., that a MAC address spoofing event or other anomaly has occurred, as described herein. The one or more actions performed may be performed based on a policy associated with the threshold of changes for one or more properties being met or exceeded. The one or more actions may include changing the VLAN and other actions as described herein.

At block 328, the timer and counter are reset. For example, the timer associated with a specific entity may be restarted or initialized (e.g., starting count time from zero) to start tracking for a particular number of changes in one or more properties within a specific period of time (e.g., a time threshold). The counter associated with an entity may be reset (e.g., set to zero) when the time threshold has been met or exceeded by the timer.

FIG. 4 illustrates example components used by various embodiments. Although specific components are disclosed in system 400, it should be appreciated that such components are examples. That is, embodiments are well suited to having various other components or variations of the components recited in system 400. It is appreciated that the components in system 400 may operate with other components than those presented, and that not all of the components of system 400 may be required to achieve the goals of system 400.

FIG. 4 depicts illustrative components of a system for determining an anomaly based on one or more properties in accordance with one implementation of the present disclosure. Example system 400 or anomaly analyzer 400 includes a network communication interface 402, an external system interface 404, a traffic monitor component 406, a property change component 408, a change tracking component 410, an anomaly determination component 412, a display component 414, a notification component 416, and an action component 418. The components of system 400 may be part of a computing system or other electronic device (e.g., network monitor device 102 or network monitor devices 280-282) or a virtual machine or device and be operable to monitor and one or more entities communicatively coupled to a network, monitor network traffic, and determine an anomaly based on changes in one or more properties associated with an entity, as described herein. For example, the system 400 may further include a memory and a processing device, operatively coupled to the memory, which may perform the operations of or execute the components of system 400. The components of system 400 may access various data and characteristics associated with an entity (e.g., from network communication information, for instance network infrastructure, network traffic, etc.), one or more properties, weights, overlapping properties, one or more selected properties, one or more thresholds associated with one or more properties, etc., as described herein. It is appreciated that the modular nature of system 400 may allow the components to be independent and allow flexibility to enable or disable individual components or to extend, upgrade, or combination thereof components without affecting other components thereby providing scalability and extensibility. System 400 may perform one or more blocks of flow diagram 300.

Communication interface 402 is operable to communicate with one or more entities (e.g., network device 104, firewalls 202-206, switches 210-220, other devices coupled thereto, devices 230-262, etc.) coupled to a network that are coupled to system 400 and receive or access information about entities (e.g., one or more properties, device information, device communications, device characteristics, etc.), access information as part of a passive scan, send one or more requests as part of an active scan, receive active scan results or responses (e.g., responses to requests), as described herein. The communication interface 402 may be operable to work with one or more components to initiate access to properties or determination of properties of an entity to allow determination of one or more properties which may then be used for anomaly detection, device compliance, asset management, standards compliance, classification, identification, etc., as described herein. Communication interface 402 may be used to receive and store network traffic for determining one or more properties associated with an entity, as described herein.

External system interface 404 is operable to communicate with one or more third party, remote, or external systems (e.g., system 150) to access information including characteristics or attributes about an entity. External system interface 404 may further store the accessed information in a data store. For example, external system interface 404 may access information from a vulnerability assessment (VA) system to enable determination of one or more compliance or risk characteristics associated with the entity. External system interface 404 may be operable to communicate with a vulnerability assessment (VA) system, an advanced threat detection (ATD) system, a mobile device management (MDM) system, a firewall (FW) system, a switch system, an access point (AP) system, etc. External system interface 404 may query a third party system using an API or CLI. For example, external system interface 404 may query a firewall or a switch for information (e.g., network session information) about an entity or for a list of entities that are communicatively coupled to the firewall or switch and communications associated therewith. In some embodiments, external system interface 404 may query a switch, a firewall, or other system for information of communications associated with an entity.

Traffic monitor component 406 is operable to monitor network traffic to determine if a new entity has joined the network or an entity has rejoined the network and monitor traffic for analysis by property change component 408, change tracking component 410, anomaly determination component 412, among others, as described herein. Traffic monitor component 406 may have a packet engine operable to access packets of network traffic (e.g., passively) and analyze the network traffic. Traffic monitor component 406 may further be operable for performing active scanning, as described herein. Traffic monitor component 406 may further be able to access and analyze traffic logs from one or more entities (e.g., network device 104, system 150, or aggregation device 106) or from an entity being monitored. The traffic monitor component 406 may further be able to access traffic analysis data associated with an entity being monitored, e.g., where the traffic analysis is performed by a third party system (e.g., system 150).

Property change component 408 is operable to determine whether one or more properties have changed, as described herein. Property change component 408 may access portions of traffic data (e.g., collected by traffic monitor component) and store the values of one or more properties. Property change component 408 may access more property values from (additional) portions of traffic data and determine whether a property has changed, as described herein. Property change component 408 can record of store information of property changes for each entity.

Change tracking component 410 is operable to monitor changes in properties as determined by property change component 408. Change tracking component 410 is operable to determine whether a property change is within a time period (e.g., time threshold) associated with a timer, increment a counter based on a property change, as described herein. Change tracking component 410 is further operable to increment the counter associated with one or more properties based on a weight (e.g., increment a counter by two or more), as described herein.

Anomaly determination component 412 is operable to determine whether an anomaly has been detected based on comparing a threshold to a value of an associated counter, as described herein. The threshold may be associated with a number of changes in one or more properties, as described herein. A number of changes in properties being equal to or greater than the threshold can be determined to meet or exceed the threshold, as described herein.

Display component 414 is configured to optionally display one or more graphical user interfaces or other interfaces (e.g., command line interface) for depicting various information associated with entities or devices, properties associated with one or more entities, changes in one or more properties, one or more thresholds, one or more weights associated with one or more properties, anomaly determinations, anomaly alerts or notifications, asset management, and compliance with standards and other policies, etc., as described herein. In some embodiments, display component 414 may display or render a network graph of entities, properties associated with each entity or device, property changes associated with one or more entities and network portions, and indications of security policy alerts, compliance alerts, etc.

Notification component 416 is operable to initiate one or more notifications based on the results of monitoring changes in properties and anomaly determinations or detection, as described herein. The notification may be any of a variety of notifications, e.g., IT ticket, email, SMS, a HTTP notification, etc., as described herein.

Action component 418 is operable for initiating or triggering one or more remediation actions or security actions according to one or more policies, e.g., based on anomaly detection, as described herein. Action component 418 may further be configured to perform other operations including checking compliance status, finding open ports, etc. Action component 418 may restrict network access, signal a patch system service, signal an update system or service, etc., as described herein. The action component 418 may thus, among other things, invoke automatically patching, automatically updating, automatically restricting network access of an entity (e.g., that has out-of-date software or based on anomaly detection), automatically changing an entity to another network portion, as described herein.

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

The system 400 may be software stored on a non-transitory computer readable medium having instructions encoded thereon that, when executed by a processing device, cause the processing device to access network traffic from a network and store a first value of a property associated with an entity communicatively coupled to the network. The first value of the property may be based on the network traffic. The instructions may further cause the processing device to access additional network traffic associated with the entity and determine a second value of the property based on the additional network traffic. The instructions may further cause the processing device to determine whether the first value of the property does not match the second value of the property and in response to the first value of the property not matching the second value of the property, store an indicator that an anomaly has detected.

In some embodiments, the instructions may further cause the processing device to perform an action based on the indicator that an anomaly has detected. In various embodiments, the instructions may further cause the processing device to increment a counter and determine whether the counter is greater than or equal to a threshold. In response to the counter being greater than or equal to the threshold, the indicator that an anomaly has detected is stored.

In some embodiments, the threshold is associated with two or more properties. In various embodiments, a weight is associated with the property and the weight is used to increment the counter. In some embodiments, at least one of the weight associated with the property or the threshold are user configurable. In various embodiments, the risk associated with the at least one entity is based on an objective associated with at least one of entity risk, entity sensitivity, or entity types in the network portion. In some embodiments, the action comprises at least one of changing a VLAN associated with the entity, quarantining the entity, initiating an update, tracking traffic of the entity, or sending a notification associated with the entity. In various embodiments, the first value of a property associated with the entity is determined without an agent.

Figure 5:
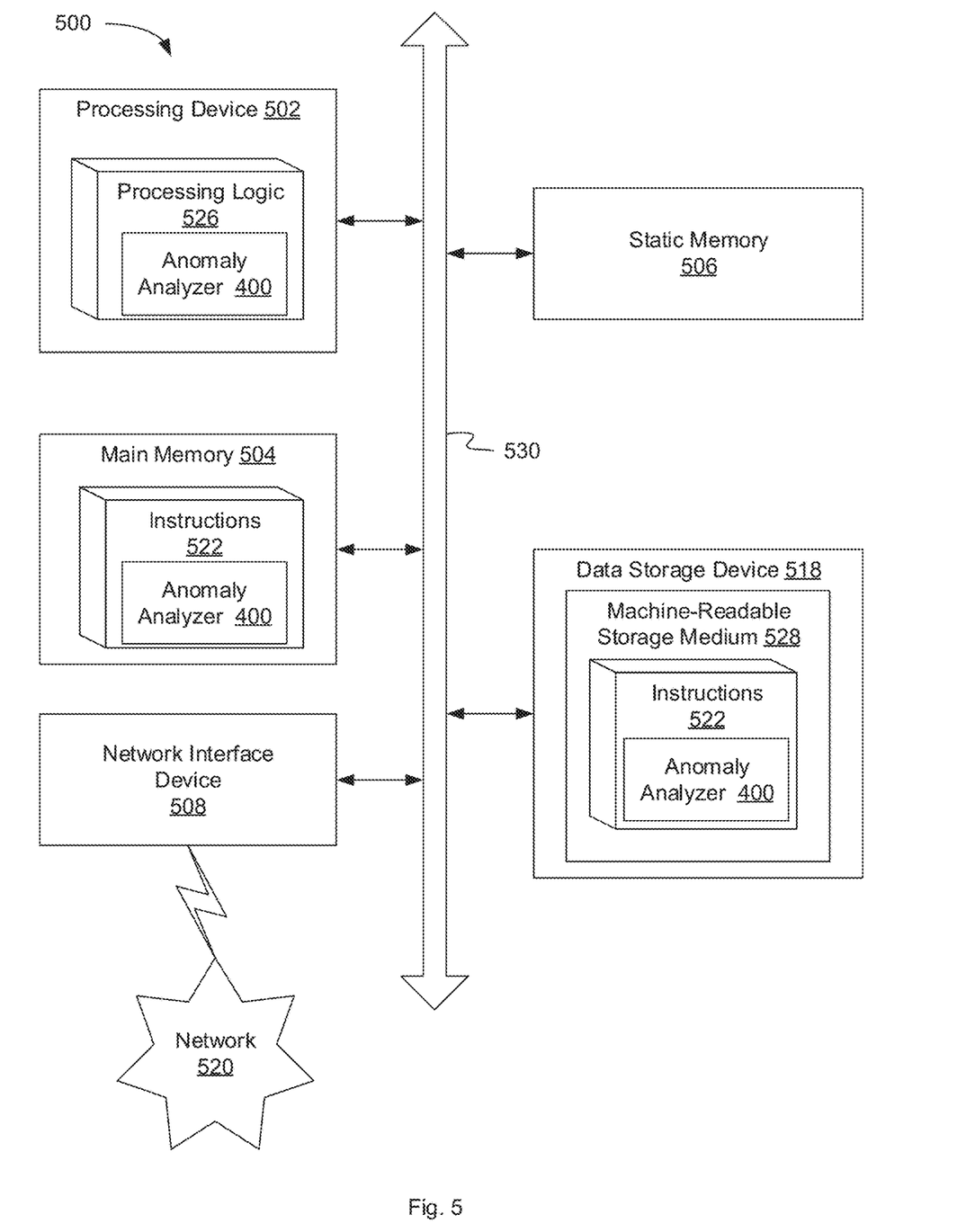
FIG. 5 is a block diagram illustrating an example computer system, in accordance with one implementation of the present disclosure.

FIG. 5 is a block diagram illustrating an example of a computer system, in accordance with one implementation of the present disclosure. FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server, such as network monitor device 102 running anomaly analyzer 400 to monitor and analyze changes in one or more properties to detect an anomaly, as described herein.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of anomaly analyzer 400 shown in FIG. 4, for performing the operations and steps discussed herein.

The data storage device 518 may include a machine-readable storage medium 528, on which is stored one or more set of instructions 522 (e.g., software) embodying any one or more of the methodologies of operations described herein, including instructions to cause the processing device 502 to execute anomaly analyzer 400. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for anomaly detection, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations, In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:
1. A method comprising:
tracking a plurality of properties that are associated with an entity that is communicatively coupled to a network, the entity having a MAC address, wherein the plurality of properties includes a switch port name or a switch port power over ethernet (POE) connected device;

storing a respective value of the plurality of properties that are associated with the entity communicatively coupled to the network, wherein each of the plurality of properties are associated with a respective weight that is associated with a priority of a respective one of the plurality of properties wherein a first of the plurality of properties is prioritized over a second of the plurality of properties based on the respective weight;

detecting a change to the plurality of properties that are associated with the same MAC address based on the stored respective value of the plurality of properties including detecting a change to the switch port name or the switch port POE connected device associated with the same MAC address;

in response to the change to the respective value of the property, incrementing a counter by an amount of the respective weight of the property wherein overlapping properties of the plurality of properties are associated with respective groups and multiple changes of the overlapping properties in one of the respective groups are counted as a single change; and in response to the counter being greater than one of a plurality of thresholds which is applied based on a device type of the entity, storing an indicator that an anomaly associated with MAC address spoofing is detected, wherein each of the plurality of thresholds is associated with a particular set of the plurality of properties.

2. The method of claim 1 further comprising:
performing an action based on the indicator that an anomaly is detected.

3. The method of claim 2, wherein the action comprises at least one of changing a virtual local area network (VLAN) associated with the entity, quarantining the entity, initiating an update, tracking further network traffic of the entity, or sending a notification associated with the entity.

4. The method of claim 1 wherein
a first weight associated with the first of the plurality of properties is different from a second weight that is associated with the second of the plurality of properties.

5. The method of claim 4, wherein the threshold is associated with two or more of the plurality of properties.

6. The method of claim 4, wherein the respective weight associated with the plurality of properties is based on a policy.

7. The method of claim 6, wherein at least one of the respective weight associated with each of the plurality of properties or the threshold are user configurable.

8. The method of claim 1, wherein the threshold is different for different portions of the network.

9. A system comprising:
a memory; and
a processing device, operatively coupled to the memory, to:
track a plurality of properties that are associated with an entity that is communicatively coupled to a network, the entity having a MAC address, wherein the plurality of properties includes a switch port name or a switch port power over ethernet (POE) connected device;
store a respective value of the plurality of properties that are associated with the entity communicatively coupled to the network, wherein each of the plurality of properties are associated with a respective weight that is associated with a priority of a respective one of the plurality of properties wherein a first of the plurality of properties is prioritized over a second of the plurality of properties based on the respective weight;
detect a change to the plurality of properties that are associated with the same MAC address based on the stored respective value of the plurality of properties including detecting a change to the switch port name or the switch port POE connected device associated with the same MAC address;
in response to the change to the respective value of the property, incrementing a counter by an amount of the respective weight of the property wherein overlapping properties of the plurality of properties are associated with respective groups and multiple changes of the overlapping properties in one of the respective groups are counted as a single change; and
in response to the counter being greater than one of a plurality of thresholds which is applied based on a device type of the entity store an indicator that an anomaly associated with MAC address spoofing is detected, wherein each of the plurality of thresholds is associated with a particular set of the plurality of properties.

10. The system of claim 9, the processing device further to:
perform an action based on the indicator that an anomaly is detected.

11. The system of claim 10, wherein the action comprises at least one of changing a virtual local area network (VLAN) associated with the entity, quarantining the entity, initiating an update, tracking further network traffic of the entity, or sending a notification associated with the entity.

12. The system of claim 9, wherein a first weight associated with the first of the plurality of properties is different from a second weight that is associated with the second of the plurality of properties.

13. The system of claim 12, wherein the threshold is associated with two or more properties.

14. The system of claim 12, wherein the respective weight associated with the plurality of properties is based on a policy.

15. The system of claim 14, wherein at least one of the respective weight associated with each of the plurality of properties or the threshold are user configurable.

16. The system of claim 9, wherein a risk that is associated with the at least one entity is determined based on an objective associated with at least one of entity risk, entity sensitivity, or entity types in the network portion.

17. The system of claim 9, wherein the threshold is different for different portions of the network.

18. A non-transitory computer readable medium having instructions encoded thereon that, when executed by a processing device, cause the processing device to:
track a plurality of properties that are associated with an entity that is communicatively coupled to a network, the entity having a MAC address, wherein the plurality of properties includes a switch port name or a switch port power over ethernet (POE) connected device;
store a respective value of the plurality of properties that are associated with the entity communicatively coupled to the network, wherein each of the plurality of properties are associated with a respective weight that is associated with a priority of a respective one of the plurality of properties wherein a first of the plurality of properties is prioritized over a second of the plurality of properties based on the respective weight;
detecting a change to the plurality of properties that are associated with the same MAC address based on the stored respective value of the plurality of properties including sensing a change to the switch port name or the switch port POE connected device associated with the same MAC address;

in response to the change to the respective value of the property, incrementing a counter by an amount of the respective weight of the property wherein overlapping properties of the plurality of properties are in respective groups and changes in the overlapping properties in a same one of the respective groups are counted as a single change; and in response to the counter being greater than one of a plurality of thresholds which is applied based on a device type of the entity, store an indicator associated with MAC address spoofing that an anomaly is detected, wherein each of the plurality of thresholds is associated with a particular set of the plurality of properties.

19. The non-transitory computer readable medium of claim 18, the processing device further to:

perform an action based on the indicator that an anomaly is detected.

20. The non-transitory computer readable medium of claim 18, wherein a first weight associated with the first of the plurality of properties is different from a second weight that is associated with the second of the plurality of properties.

* * * * *